United States Patent
Rosata et al.

(10) Patent No.: US 12,459,637 B2
(45) Date of Patent: Nov. 4, 2025

(54) ELECTROMECHANICAL DRIVE SYSTEM FOR AN AIRCRAFT

(71) Applicant: Mecaer Aviation Group S.P.A., Borgomanero (IT)

(72) Inventors: Pietro Rosata, Borgomanero (IT); Mario Rossano, Borgomanero (IT); Vittorio Lignarolo, Borgomanero (IT)

(73) Assignee: MECAER AVIATION GROUP S.P.A., Borgomanero (IT)

(*) Notice: Subject to any disclaimer, the term of this patent is extended or adjusted under 35 U.S.C. 154(b) by 0 days.

(21) Appl. No.: 18/705,411

(22) PCT Filed: Oct. 28, 2022

(86) PCT No.: PCT/IB2022/060378
§ 371 (c)(1),
(2) Date: Apr. 26, 2024

(87) PCT Pub. No.: WO2023/073629
PCT Pub. Date: May 4, 2023

(65) Prior Publication Data
US 2025/0229892 A1    Jul. 17, 2025

(30) Foreign Application Priority Data
Oct. 29, 2021    (IT) .................. 102021000027833

(51) Int. Cl.
*B64C 13/50*    (2006.01)
(52) U.S. Cl.
CPC .................. *B64C 13/507* (2018.01)
(58) Field of Classification Search
CPC ........ B64C 13/50; B64C 13/507; B64C 13/03
See application file for complete search history.

(56) References Cited

U.S. PATENT DOCUMENTS

| | | | |
|---|---|---|---|
| 7,044,024 B1 * | 5/2006 | Younkin | F16D 7/025 192/56.6 |
| 8,907,536 B2 * | 12/2014 | Cremiere | H02K 11/28 310/68 B |

(Continued)

FOREIGN PATENT DOCUMENTS

| | | | | |
|---|---|---|---|---|
| DE | 2700918 A1 | 7/1978 | | |
| DE | 102018124489 A1 * | 4/2020 | | B60K 6/26 |

(Continued)

OTHER PUBLICATIONS

European Patent Office; International Search Report & Written Opinion for International Patent Application No. PCT/IB2022/060378 dated Nov. 28, 2022, 12 Pages.

*Primary Examiner* — Assres H Woldemaryam
(74) *Attorney, Agent, or Firm* — Christopher J. Knors; Moore & Van Allen PLLC

(57) ABSTRACT

Electromechanical drive system (1) to control a transmission shaft (2) connected to the mechanical operating systems of an aircraft, comprising an electric machine (3), a two-way transmission rotation (8) and a clutch assembly (9) wherein the two-way transmission rotation (8) is configured, in any direction of rotation of the transmission shaft (2), to selectively allow the passage of torque either only between the electric machine (3) and the transmission shaft (2) when the torque is supplied by the electric machine (3) to the transmission shaft (2) or between the transmission shaft (2), the clutch assembly (9) and the electric machine (3) when the torque is supplied by the transmission shaft (2) to the electric machine (3).

15 Claims, 6 Drawing Sheets

(56) References Cited

U.S. PATENT DOCUMENTS

| | | | |
|---|---|---|---|
| 10,000,275 B2 | 6/2018 | Tendola et al. | |
| 2004/0121872 A1* | 6/2004 | Eymuller | F16D 25/0638 |
| | | | 475/86 |
| 2016/0340025 A1* | 11/2016 | Tendola | B64F 5/00 |

FOREIGN PATENT DOCUMENTS

| | | | | |
|---|---|---|---|---|
| EP | 2947005 A1 | 11/2015 | | |
| JP | 2016107698 A | 6/2016 | | |
| RU | 2741404 C2 * | 1/2021 | | B60K 1/00 |

* cited by examiner

ELECTROMECHANICAL DRIVE SYSTEM FOR AN AIRCRAFT

CROSS-REFERENCE TO RELATED APPLICATIONS

This application is a 35 U.S.C. § 371 National Stage Application of International Application No. PCT/IB2022/060378, filed Oct. 28, 2022, which claims the benefit of Italian Patent Application No. 102021000027833, filed on Oct. 29, 2021, the entirety of each of which is incorporated herein by reference.

TECHNICAL FIELD

The present invention relates to an electromechanical drive system, for applications to fixed or rotary wing aircraft.

The present invention is preferably, although not exclusively, applied to the sector of aircrafts, to which such application will refer in the following by way of example.

STATE OF THE PRIOR ART

Manual mode control and autopilot mode control systems are known which are used in the electromechanical actuation of aircraft parts.

In particular, currently there are active or passive control systems diversified by the function that they perform, the so-called trim actuators for the autopilot mode control function and fixed rigidity spring commands for the manual mode control. This diversification entails flight command assemblies which are particularly bulky, heavy and comprise numerous units.

In particular, it is also known to configure such systems so that, during the manual control, a resistance to the action of the driver is imparted so as to prevent possible malfunctions which would lead to disastrous accidents of the aircraft.

Likewise, there are integrated control systems for performing the manual and autopilot control of the aeroplane, which comprise therein additional active systems such as actuators, solenoids or other electromechanical machines which allow passing from one mode to the other based on an external signal and controlled through additional integrated electronics.

Therefore, the need is felt for reducing the components of such control systems so as to reduce weight, bulks and production, maintenance and management costs making the entire control of the system aircraft efficient, nevertheless preventing active additional elements, and thus electrical consumption and heat dissipation linked to the latter, as well as the increase in weight and cost.

The object of the present invention is to meet the above-described requirements in an optimised and cost-effective manner.

SUMMARY OF THE INVENTION

The aforementioned object is achieved by an electromechanical drive system for aircraft as claimed in the appended claims.

BRIEF DESCRIPTION OF THE DRAWINGS

In order to better understand the present invention, a preferred embodiment is described in the following, by way of non-limiting example and with reference to the accompanying drawings, wherein:

FIG. 5 is an exploded perspective view illustrating the device of FIG. 4; and.

DETAILED DESCRIPTION OF THE INVENTION

Figure 1:
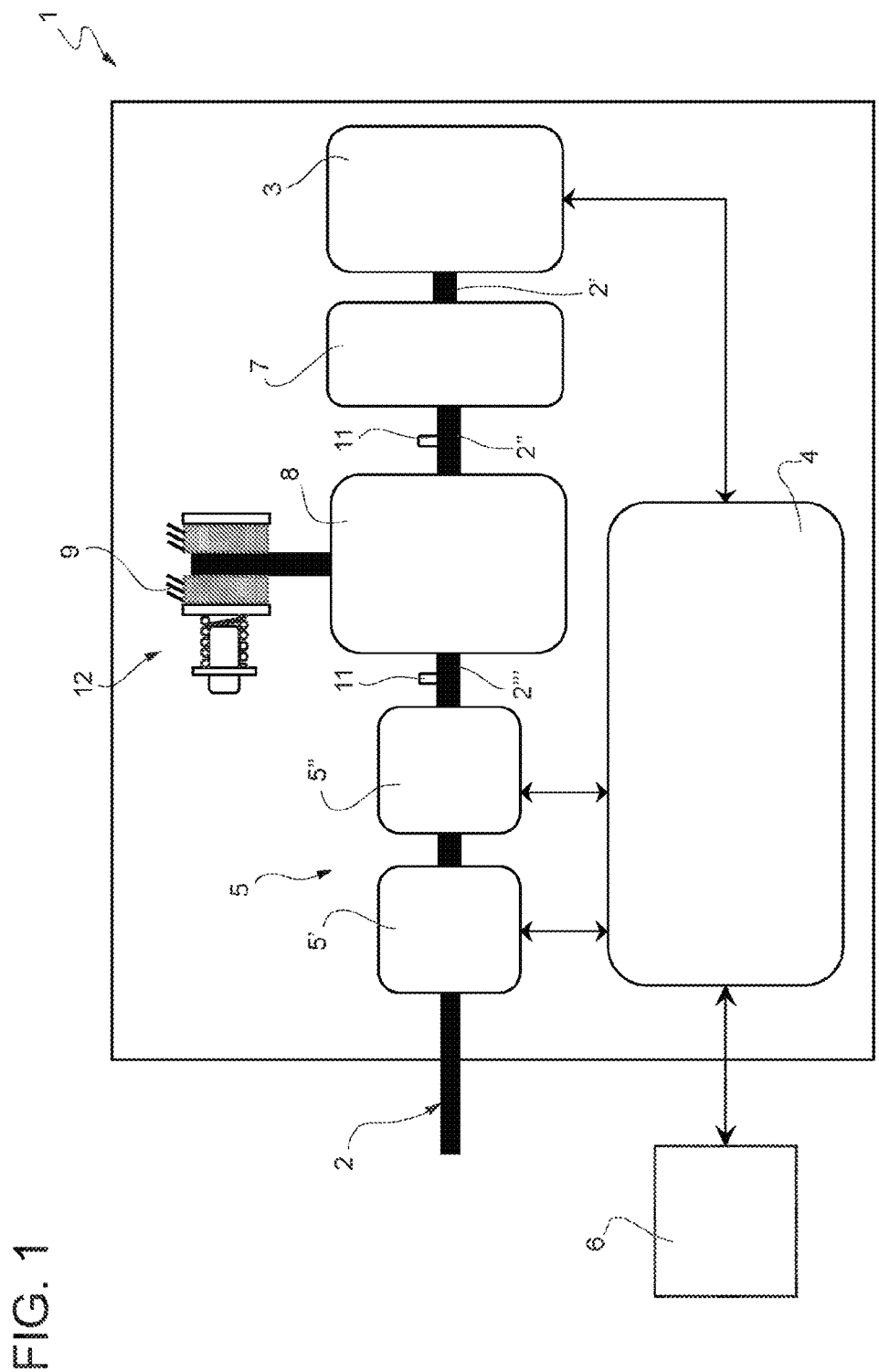
FIG. 1 is a schematic block diagram illustrating a drive system of an aircraft comprising a control system according to the invention.
Figure 2:
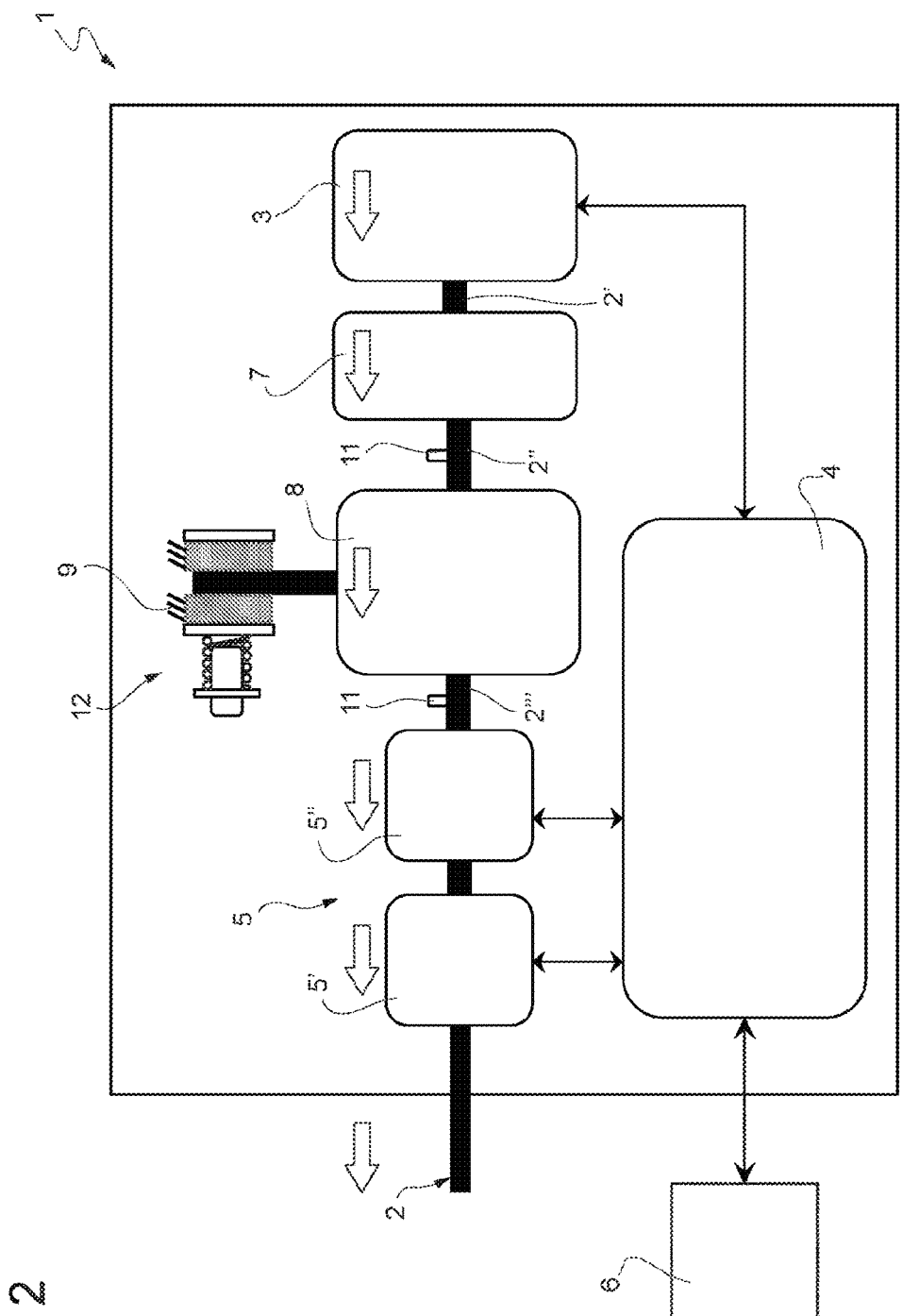
FIG. 2 illustrates the diagram of FIG. 1 in a first operating condition.
Figure 3:
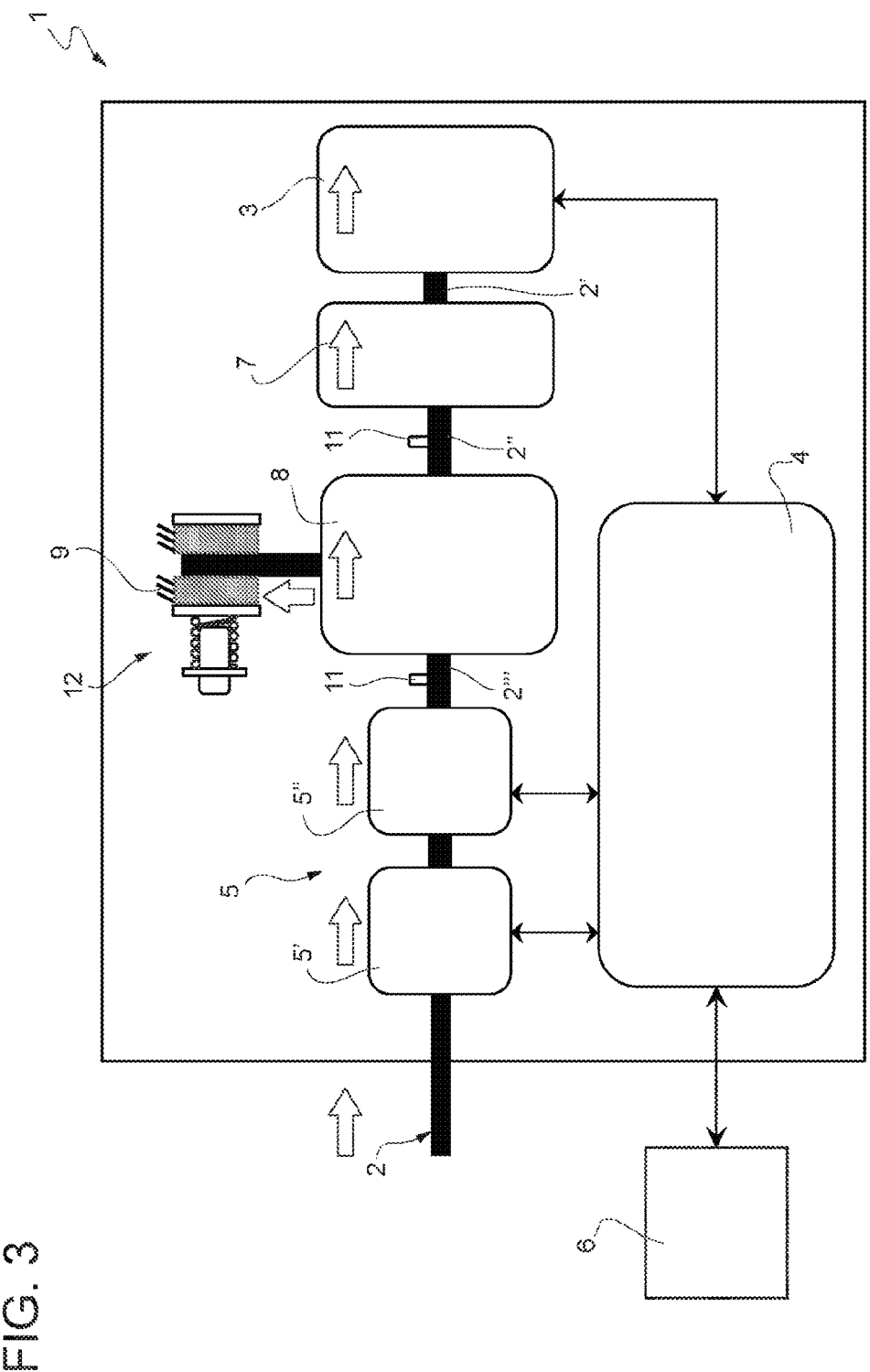
FIG. 3 illustrates the diagram of FIG. 1 in a second operating condition.

FIGS. 1 to 3 schematically illustrate an electromechanical drive system 1 for an aircraft, not illustrated in its wholeness for clarity.

In particular, the electromechanical drive system 1 comprises a transmission shaft 2 operatively connected to an electric machine 3, such as an electric motor, configured to at least operate in an operating state in which it transforms electric energy in order to drag in rotation the transmission shaft 2.

The electromechanical drive system 1 comprises an electronic unit 4 configured to control the operation of the electric machine 3 based on data coming from a plurality of sensor means 5 and of other operating systems 6 of the aircraft communicating with the electromechanical drive system 1.

In particular, the transmission shaft 2 is dedicated to controlling other mechanical operating systems (not illustrated of the aircraft). Non-limiting and non-exhaustive examples of such operating systems 6 are the on-board computer (also called Flight Control Computer, FCC) or the external avionics (air data sensors, inertial navigation system), which send to the electromechanical drive system 1 useful data for configuring the control (trims, flight speed, envelope) and receive information from the electromechanical drive system 1 concerning the operation thereof. A non-limiting and non-exhaustive example of the aforementioned mechanical operating systems is the flight command assembly of the aircraft, which by means of rods, quadrants and intermediate controls connects the command of the pilot in the cockpit to the primary flight actuators.

Consequently, the electronic unit 4 comprises processing means configured to be electrically connected to the electric machine 3, to the sensor means 5 and to the other operating systems 6 of the aircraft in order to acquire data from the latter and consequently control the electric machine 3.

The sensor means 5 are configured to detect a physical quantity relating to an operating condition of the transmission shaft 2. In particular, the sensor means 5 can comprise torque sensors 5' or position sensors 5" installed on the rotating shaft 2.

The electric machine 3 is advantageously connected to the transmission shaft 2 by means of a transmission assembly 7, advantageously a reduction assembly configured to vary a torque/speed between transmission shaft 2 and electric machine 3. In particular, the transmission assembly 7 comprises a plurality of gears, not further described in the following.

According to the invention, the electromechanical drive system comprises a two-way transmission rotation 8 operatively placed downstream of the transmission assembly 7 and operatively connected to a clutch assembly 9.

Specifically, the two-way transmission rotation 8 is configured to allow the transmission of the torque coming from the electric machine 3 by means of the transmission assembly 7 towards the transmission shaft 2 without torque dissipation by means of the clutch assembly 9 during a first operation mode (FIG. 2) and to allow the transmission of the torque coming from the transmission shaft 2 towards the electric machine 3 by means of the transmission assembly 7 with torque dissipation by means of the clutch assembly 9 (FIG. 3) with the aim to adjust the reversibility load of the actuation system, i.e. of the torque perceived by the pilot.

In particular, according to what described above, it is evident that the transmission shaft 2 comprises a first portion 2' between the electric machine 3 and the transmission assembly 7, a second portion 2" between the latter and the two-way transmission rotation 8 and a third portion between the latter towards the mechanical operating systems of the aircraft.

Advantageously, the above-described sensor means 5 are placed on the opposite side of the electric machine 3 with respect to the two-way transmission 8 (i.e. on the transmission shaft 2), whereas the transmission assembly 7 is placed on the same side of the electric machine 3, axially between the latter and the two-way transmission 8.

Preferably, the electromechanical drive system 1 also comprises safety devices 11 configured to interrupt the transmission of torque on the shaft on which they are placed when a predefined designed torque is reached.

Such safety devices 11 can comprise mechanical fuses, integral with two portions of the shaft to which they are provided and configured to break, thus preventing the transmission of the torque between the two portions of such shaft.

In particular, in the system according to the present invention, safety devices 11 are provided on the third portion 2''' of the transmission shaft 2, i.e. between the two-way transmission 8 and the sensor means 5 and on the second portion 2" of the transmission shaft 2, i.e. between the transmission assembly 7 and the two-way transmission 8.

Preferably, the clutch assembly 9 comprises adjusting means 12 configured to adjust the braking torque imparted by the clutch assembly. Advantageously, such adjusting means 12 are mechanical adjusting means adapted to vary an axial preload of the clutch assembly 9 which increases or decreases the friction between the sliding elements relating to the same.

Advantageously, the two-way transmission 8 and the clutch assembly 9 are made as a single assembled component.

Figure 4:
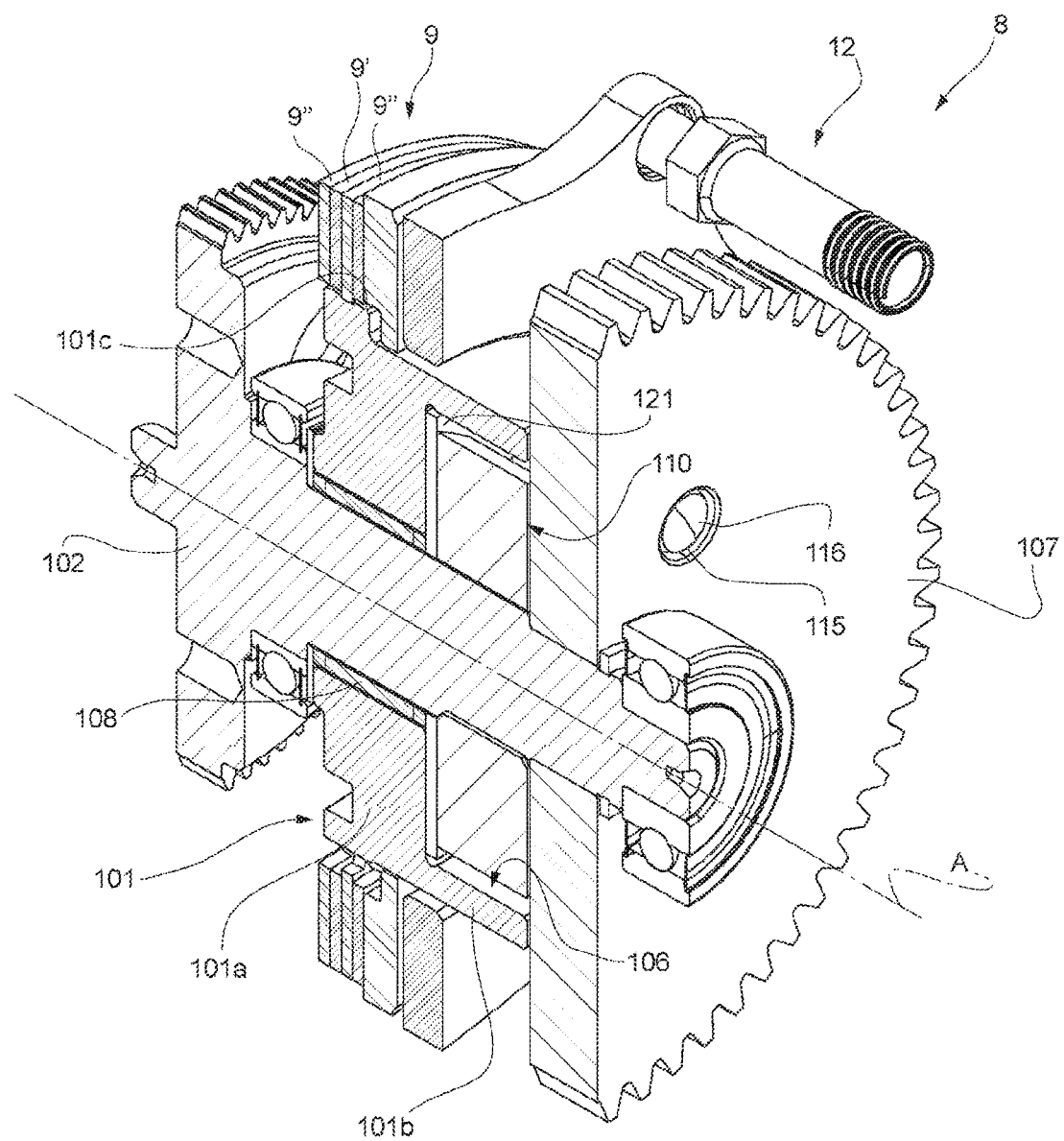
FIG. 4 is a sectional perspective view illustrating a device of the control system according to the invention.
Figure 5:
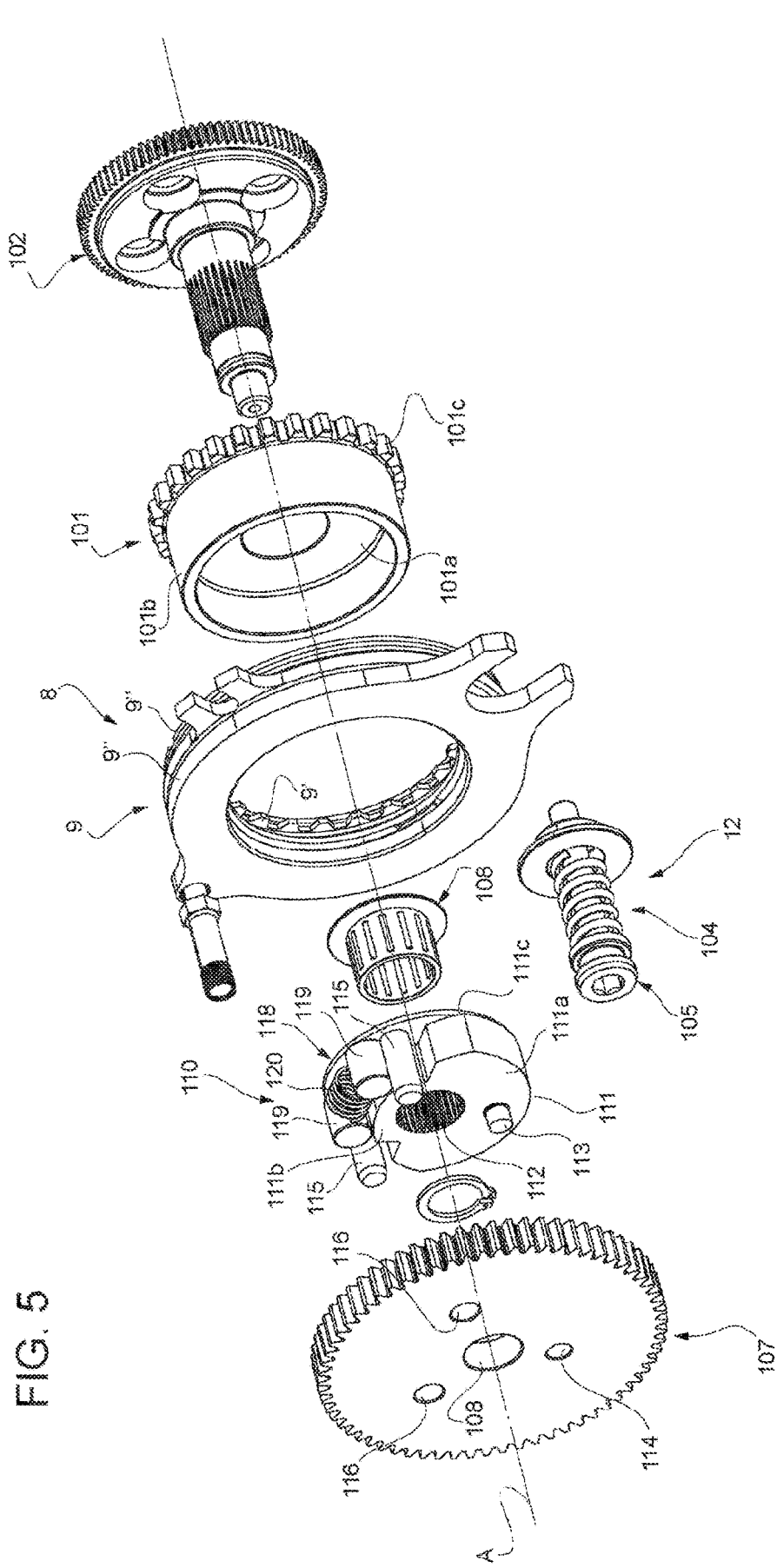
Figure 6:
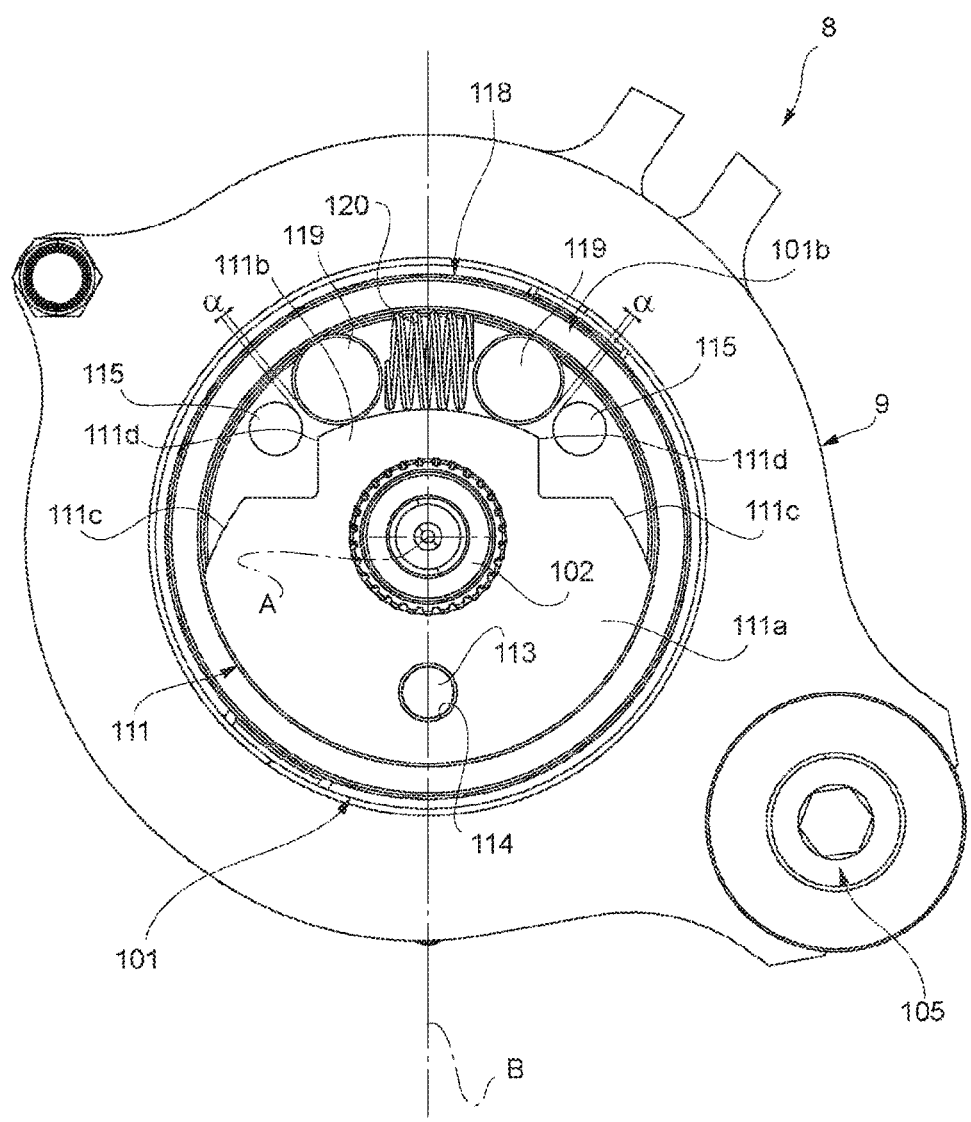
FIG. 6 is an axial sectional view of the device of FIG. 4.

Referring to FIGS. 4 to 6, an advantageous embodiment of the two-way transmission 8 is illustrated.

The two-way transmission 8 comprises a housing 101 configured to be supported rotationally free on a rotating shaft 102 which is rigidly connected to two portions of the transmission shaft 2, specifically between the third and the second portions 2", 2''' of the same.

The housing 101 is advantageously concentric and axially symmetrical with respect to an axis A of the rotating shaft 102 and comprises a cylindrical portion 101a and a tubular portion 101b extending cantilevered from the outer perimeter of the cylindrical portion 101a.

The cylindrical portion 101a comprises a portion 101c configured to be integrally connected to the clutch assembly 9. In particular, the portion 101c is configured as a toothing adapted to engage a respective toothing made in a movable portion 9' of the clutch assembly 9. Such movable portion 9' can comprise one or more clutch plates between two fixed portions 9" of the clutch assembly 9.

The above-mentioned adjusting means 12 advantageously comprise elastic means 104 configured to impart an axial preload between the fixed portions 9" and the movable portions 9' and compression means 105 configured to vary the preload of the elastic means 104 supplied to the aforementioned portions 9', 9".

In particular, as is illustrated, the elastic means 104 comprise a helical spring configured to be compressed by the compression means 105 which comprise a screw fixed by means of thread on a support on which the helical spring is inserted in an axially symmetrical manner with respect to the screw.

The tubular portion 101b defines a space 106 radially delimited by the tubular portion 101b and axially delimited by the cylindrical portion 101a on one side and open on the opposite side.

On such side, the two-way transmission 8 comprises a plate 107 configured to be operatively connected to the transmission assembly 7 of the electromechanical drive system 1.

The plate 107 defines a central opening 108 configured to house a portion of the rotating shaft 102 in a rotationally free manner.

Advantageously, the housing 101 is supported on the shaft 102 by means of support means such as a bushing 108 and houses, in the space 106 defined between the tubular portion 101b and the plate 107, a decoupling mechanism 110.

The decoupling mechanism 110 is configured to allow the transmission of torque in both directions of rotation of the rotating shaft 102 in two different conditions:

in a first condition, wherein the torque comes from the transmission assembly 7 towards the rotating shaft 102, the decoupling mechanism 110 rotates within the space 106 integral with the plate 107 and the rotating shaft 102 without the clutch assembly 9 interfering with the transmission of torque;

in a second condition, wherein the torque comes from the rotating shaft 102 towards the transmission assembly 7, the decoupling mechanism 110 drags the housing 101 which thus drives in rotation the movable portion 9' of the clutch assembly 9 generating a torque resistant to the motion of the rotating shaft 102.

More specifically, the decoupling mechanism 110 comprises a rotating body 111, better visible in FIG. 5, defining an opening 112 configured to house through it the rotating shaft 102 and make it integral to the rotation with the rotating body 111.

The rotating body 111 comprises a semi-cylindrical portion 111a and a central protrusion 111b radially extending in a symmetrical manner with respect to a transverse axis B, perpendicular to the axis A, of the semi-cylindrical portion 111a. Advantageously, the diametrical edges 111c of the semi-cylindrical portion 111a are bevelled and the diametrical edges 111d of the central portion 111b are bevelled.

The decoupling mechanism 110 further comprises engaging means configured to make the plate 107 integral with the rotating body 111. Preferably, such engaging means comprise at least one pin 113 configured to integrally insert within an opening 114 obtained in the semi-cylindrical portion 111a and within an opening 114 obtained in the plate 107, in a rotationally free manner with respect thereto.

The decoupling mechanism 110 further comprises a pair of actuator elements 115, preferably shaped as axially symmetric elements such as cylinders, configured to be housed in respective openings 116 made on the plate 107 and extending within the space 106 beside the central portion 111b of the rotating body 111.

The decoupling mechanism 110 further comprises locking means 118 housed in the space 106 and in particular circumferentially comprised between the actuator elements 115 and radially above the central portion 111b.

In particular, the locking means 118 comprise a pair of rotating elements 119, such as cylindrical pins, and elastic means 120 operatively interposed between the rotating elements 119. In particular, the rotating elements 119 are arranged in contact with the tubular portion 101b and the central portion 111b, between the edges 111d of the latter advantageously symmetrically with respect to the axis B.

In particular, in circumferential direction with respect to the axis A, each rotating element 119 is spaced apart by a distance α with respect to an actuator element 115. Therefore, if necessary, before contacting the rotating element 119, the actuator element 115 can circumferentially move for a short angular distance. In particular, the distance α is approximately 0.1 mm.

The elastic means 120 are configured to impart an opposite force along a direction perpendicular to the axes A and B of the rotating elements 119 when one of the latter acts on the elastic means 120.

Advantageously, the semi-cylindrical portion 101a of the rotating body 101 is axially separated along the axis A from the rotating body 111 by means of sliding support means 121 such as a friction plate.

Conveniently, the tubular portion 101b of the housing 101 is axially spaced apart so as not to be in contact with the plate 107.

The operation of the embodiment of the above-described electromechanical drive system is the following.

As is illustrated in FIG. 2, during an autopilot operation condition, the torque is supplied by the electric machine 3 by means of control of the electronic unit 4. The latter adjusts the torque to be supplied based on the inputs provided by the operating elements 6 of the aircraft and in control, for example in closed loop, by means of the data found by the sensor means 5. The torque supplied by the electric machine 3, after passing by means of the transmission assembly 7, passes by means of the two-way transmission 8. In this case, the clutch assembly 9 is not activated and the torque passes directly to the transmission shaft 2.

In the opposite case, illustrated in FIG. 3 and relating to a manual operation condition, the torque is supplied directly, by means of manual commands not illustrated, to the transmission shaft 2. Such torque passes to the two-way transmission 8 and here the clutch assembly 9 is activated and absorbs part of the torque thus generating on the actuations of the transmission shaft 2 a feeling of passive resistance perceivable by the pilot, otherwise called reversibility load.

If necessary, in the setting step, such resistance can be adjusted by means of the adjusting means 12 making the system versatile for numerous application fields.

In case of seizure of the two-way transmission 8 or of the transmission assembly 7 which would prevent the rotation of the transmission shaft, the safety devices 11 break the transmission shaft 2 and allow the relative rotation with respect to the axis A of the third portion 2''' thereof, i.e. a purely manual control thereof.

Referring to the operation of the two-way transmission rotation 8, in the autopilot operation configuration with the motion act coming from the electric machine 3, the torque is imparted by the plate 107 and thus to the pin 113. The actuator pins 115, consequently placed in rotation by the plate 107, exceed the distance α and in contact with the rotating elements 119 move them with respect to the outer surface of the portion 111b of the rotating body 111 and to the housing 101, allowing the relative rotation of the rotating body 111 within the space 106 of the housing 101.

In this manner, the entire decoupling mechanism is made to rotate around the axis A with respect to the housing 101, kept locked to the rotation by the elements of the clutch assembly 9. Consequently, the movable portion 9' of the clutch assembly 9 is not actuated. The rotating body 111 thus drags in rotation the rotating shaft 102 transmitting the torque coming from the electric machine 3 by means of the coupling made in the opening 112.

On the other hand, in the manual mode operation configuration, the torque is imparted by the rotating shaft 102 which is connected by means of the opening 112 to the rotating body 111. Owing to the presence of the locking means 118, the rotating body 111 is now integral with the housing 101. In particular, such coupling is made possible by the contact between the central portion 111b and the rotating elements 119 which engage with respect to one another in contact with the housing 101b. Therefore, the housing 101 will be forced to rotate dragging therewith the movable portion 9' of the clutch assembly 9 generating a resistant torque. At the same time, the rotating body 111 dragged by the rotating shaft 102 cooperates through the pin 113 in dragging therewith the plate 107 and thus supplying torque to the transmission assembly 7 towards the electric machine 3.

Based on the foregoing, the advantages of an electromechanical drive system according to the invention are evident.

Thanks to the illustrated electromechanical drive system it is possible to control in an optimised manner parts of an aircraft without using known trim actuators or fixed spring mechanisms or integrated versions of the latter with the addition of further active elements such as electrochemical machines intended to manage the exclusiveness of each function which they must satisfy, which entail additional weights and electrical consumptions.

In fact, the management of the reversibility load takes place in a completely automatic manner exploiting the decoupling mechanism 110, without the use of electromechanical machines aimed at actively managing the load path change.

In this manner, the number of the elements used is reduced and thus bulks and production costs, as well as costs for the management and maintenance of the parts.

Still, thanks to the braking torque adjustable by means of the compression means, it is possible to adjust the feeling perceived by the pilot during the manual control of the drive system, ensuring the versatility of the actuation system.

Finally, it is clear that modifications and variations can be made to the electromechanical drive system according to the present invention, which anyway do not depart from the scope of protection defined by the claims.

For example, it is clear that the control of the electric machine and the sensor means used for such purpose can be of various type.

Also, the transmission assembly and the clutch device can be manufactured according to design requirements.

Furthermore, the two-way transmission 8 can be manufactured in a different manner. For example, the pin 113 can be replaced by a tongue or by more locking pins.

Still, the elastic means 120 can be replaced by a deformable and compressible element such as a polymeric support.

Likewise, the rotating elements 119 could be replaced by balls or other rotating elements.

Still, the angular position of the pins 115 can be varied according to the design requirements.

Still, bushings and other friction contact elements can be replaced by mechanically equivalent elements such as bearings or layers of lubricant.

The invention claimed is:

1. An electromechanical drive system to control a rotating shaft of an aircraft, said drive system comprising:
    a transmission shaft of a transmission assembly connectable to a mechanical operating system of said aircraft,
    an electric machine configured to impart or receive a torque from said transmission shaft,
    a two-way transmission operatively interposed between said transmission shaft and said electric machine,
    sensor means configured to detect a physical quantity relating to the operation of said transmission shaft,
    an electronic unit electronically connectable to operating systems of said aircraft, to said electric machine and to said sensor means, said electronic unit comprising processing means configured to receive data from said operating systems, said electric machine and said sensor means for controlling said electric machine,
    a clutch assembly operatively interposed between said transmission shaft and said two-way transmission,
    wherein said two-way transmission is configured, in any direction of rotation of said transmission shaft, to allow the passage of torque:
        (i) in a first operation mode, wherein said torque is supplied by said electric machine to said transmission shaft, exclusively between said electric machine and said transmission shaft; or
        (ii) in a second operation mode, wherein said torque is supplied by said transmission shaft to said electric machine between said transmission shaft, said clutch assembly and said electric machine.

2. The electromechanical drive system according to claim 1, wherein said sensor means comprise position sensor means and/or torque sensor means.

3. The electromechanical drive system according to claim 1, wherein said two-way transmission is interposed between a first portion of said transmission shaft operatively connected to said electric machine and a second portion of said transmission shaft operatively connected to mechanical operating systems of said aircraft.

4. The electromechanical drive system according to claim 3, wherein the transmission assembly is operatively interposed between said first portion of said transmission shaft and said electric machine, wherein said transmission assembly is configured to vary the torque/speed between said first portion of said transmission shaft and said electric machine.

5. The electromechanical drive system according to claim 3, comprising safety means carried by said first and second portion of said transmission shaft and configured to break at a predetermined torque value preventing the transmission of torque along said portion of said transmission shaft.

6. The electromechanical drive system according to claim 5, wherein said safety means comprise mechanical fuses.

7. The electromechanical drive system according to claim 3, wherein said two-way transmission comprises:
    a housing and said rotating shaft, wherein said rotating shaft is rigidly connected to said first and second portions of said transmission shaft, wherein said housing is carried rotationally free by said rotating shaft, is operatively connected to said clutch assembly and defining a space, and
    a decoupling mechanism housed in said space and configured to assume a first configuration in which it rotates within said space by rolling inside said housing without transmitting torque therewith and a second configuration in which it drags said housing which drags said clutch assembly.

8. The electromechanical drive system according to claim 7, wherein said decoupling mechanism comprises:
    a rotating body integral with said rotating shaft, said rotating body having a symmetrical shape to a vertical axis perpendicular to a rotation axis of said two-way transmission rotation and comprising a semi-cylindrical portion and a central portion extending radially in a perpendicular direction from said semi-cylindrical portion, wherein said rotating body is integral with a plate,
    actuator means carried integrally by a plate integral with said rotating body,
    locking means circumferentially interposed between said actuator means and configured to assume a first configuration in which the locking means slide dragged by said actuator means inside said space rolling inside said housing without transmitting torque therewith and a second configuration in which the locking means cooperate in contact with said central portion of said rotating body hinging between said rotating body and said housing transmitting torque between said rotating shaft and said clutch assembly.

9. The electromechanical drive system according to claim 8, wherein said actuator means comprise a pair of pins placed symmetrically with respect to said vertical axis, said locking means comprise a pair of rotating elements housed in contact between the central portion of said rotating body and said housing and circumferentially housed between said pair of pins, wherein said pair of rotating elements is symmetrically housed to said vertical axis.

10. The electromechanical drive system according to claim 9, wherein said locking means comprise elastic means circumferentially interposed between said pair of rotating elements, wherein said elastic means is configured to transmit a force between said pair of rotating elements.

11. The electromechanical drive system according to claim 9, wherein said pair of rotating elements and said actuator means are spaced apart by a circumferential space.

12. The electromechanical drive system according to claim 7, wherein said clutch assembly comprises at least one movable portion with respect to at least one pair of fixed portions said movable portion moving with friction between said pair of fixed portions, said housing is rigidly connected to said movable portion.

13. The electromechanical drive system according to claim 1, wherein said clutch assembly comprises adjusting means configured to vary a braking torque supplied by said clutch assembly.

14. The electromechanical drive system according to claim 13, wherein said clutch assembly comprises at least one movable portion with respect to at least one pair of fixed portions said movable portion moving with friction between said pair of fixed portions, and wherein said adjusting means are configured to vary a preload force between said movable portion and said pair of fixed portions.

15. An aircraft comprising the electromechanical drive system according to claim 1.

* * * * *